United States Patent [19]
Yamaura

[11] Patent Number: 6,034,779
[45] Date of Patent: Mar. 7, 2000

[54] ARRAY ELEMENT EXAMINATION METHOD AND ARRAY ELEMENT EXAMINATION DEVICE

[75] Inventor: Hitoshi Yamaura, Akishima, Japan

[73] Assignee: Hoya Corporation, Japan

[21] Appl. No.: 09/128,823

[22] Filed: Aug. 4, 1998

[30] Foreign Application Priority Data

Aug. 8, 1997 [JP] Japan ................................... 9-214528

[51] Int. Cl.[7] .................................................. G01B 11/14
[52] U.S. Cl. ............................................. 356/375; 385/33
[58] Field of Search .................................. 356/375, 73.1, 356/121, 399–401; 385/33, 35

[56] References Cited

U.S. PATENT DOCUMENTS

| | | | |
|---|---|---|---|
| 5,287,165 | 2/1994 | Ulich et al. ............................. | 356/121 |
| 5,446,815 | 8/1995 | Ota et al. ................................. | 385/33 |
| 5,657,131 | 8/1997 | Csipkes et al. ......................... | 356/73.1 |
| 5,857,042 | 1/1999 | Robertson et al. ...................... | 385/33 |

*Primary Examiner*—Hoa Q. Pham
*Attorney, Agent, or Firm*—Cook, Alex, McFarron, Manzo, Cummings & Mehler, Ltd.

[57] ABSTRACT

An array element examination method in which a relative position of an array element can be examined with a high resolution, in a broad range and relatively inexpensively. Lights from fibers of a fiber array are radiated to a lens array having optical axes corresponding to the fibers arranged substantially parallel with one another, and substantially parallel lights are fetched from the lens array. In order to prevent any trouble from occurring even if a photographing range is limited, images of the parallel lights from the lens array are formed on the substantially identical point by the image forming lens. The formed fiber images are photographed by a CCD camera, and relative positions of the elements are obtained from photographing signals by a computer. It is determined from the deviation from the identical point whether or not the fiber array is good.

21 Claims, 6 Drawing Sheets

ARRAY ELEMENT EXAMINATION METHOD AND ARRAY ELEMENT EXAMINATION DEVICE

REFERENCE TO RELATED APPLICATION

This application claims the priority right of Japanese Patent Application No. Hei 09-214528 filed on Aug. 8, 1997, the entire disclosure of which is incorporated herein by reference.

BACKGROUND OF THE INVENTION

1. Field of the Invention

The present invention relates to a method of examining an array element in which plural elements are arrayed in a predetermined arrangement and to an array element examination device, particularly to a method and a device and more which are suitable for examination of fiber positions in a fiber array block.

2. Description of the Related Art

In a conventional array element examination method, the entire array element is photographed by, for example, a CCD camera or the like, photographing signals are image-processed, and the position of each element is obtained. Alternatively, by detecting each element with a movable stage, the relative position of each element is obtained from the movement of the stage.

The conventional examination method is constituted as aforementioned, but recently the elements have been made increasingly fine. Therefore, an element position precision of 1 $\mu$m or less is also increasingly requested.

In this respect, in the image processing by the CCD camera, since plural elements are entirely photographed as they are, the photographing range is limited in order to obtain a high resolution. For example, to obtain a resolution of 0.1 $\mu$m, the range is limited to several tens of $\mu$m.

On the other hand, in a case where the movable stage is used, a measurement range can be enlarged, but the examination device becomes very expensive because the stage has to be moved with a high precision.

SUMMARY OF THE INVENTION

Wherefore, an object of the invention is to provide an array element examination method and an array element examination device which can examine a position of an array element with a high resolution, in a broad range and relatively inexpensively.

To attain this and other objects, in a first array element examination method of the invention, positions of plural elements arranged in an array state are detected by using an optical detector. Lights from the plural elements are fetched by a lens array which has plural lenses with optical axes corresponding to the elements arranged substantially parallel with one another, an image of a light from each lens of the lens array is formed within a light receiving region of the optical detector or detecting means by an image forming lens, the formed image of the element is detected, and a position of each element is obtained from a detection signal.

The lights of plural elements are formed into images within the light receiving region of the detecting means. Therefore, as compared with the method in which plural elements are entirely photographed as they are, examination can be made with a higher resolution and in a broader range, and the measurement can be performed relatively inexpensively.

Additionally, if there is no error in a measurement system, for example, if there is no pitch error or the like in plural elements, then the images of plural elements are formed in a predetermined position (the identical point or the like) in the light receiving region of the detecting means. If there is a pitch error or the like, however, the images are formed in positions deviated from the predetermined position, and it can be easily determined from the deviation whether or not the array element is good. More specifically, the array element is an optical fiber.

Moreover, according to a second array element examination method of the present invention, in the first array element examination method for detecting the position of the array element in which plural elements have optical axes substantially parallel with one another and are arranged in an array state in such a manner that the coordinate of the i-th element (i=1 to N, N denotes the number of elements) in a plane perpendicular to the optical axes is represented by (where $Xo_i$, $Yo_i$), there are provided a lens array in which plural lenses corresponding to the plural elements and having focal lengths $f_1$ equal to the substantially mutually parallel optical axes are arranged in such a manner that the coordinate of the optical axis of the i-th lens in a plane perpendicular to the optical axis of each lens is represented by ($X1_i$, $Y1_i$) and an image forming lens having a focal length $f_2$ for forming an image of a light from each lens of the lens array.

When the lens array and the image forming lens form an image of each element within a plane of a detecting surface in the light receiving region of the detecting means which is perpendicular to the optical axes of the lenses constituting the lens array, the lens array and the image forming lens are arranged relative to plural elements in such a manner that relationships of the following expressions (1) to (3) are satisfied. The light from the i-th element among the plural elements is fetched by the i-th lens in the lens array, and the fetched light is formed into an image in a desired position ($Xs_i$, $Ys_i$) on the detecting surface by the image forming lens. The formed image of each element is detected, and the position of each element is obtained from a detection signal.

$$Xo_i-(k \times X1_i)=Xs_i/M \tag{1}$$

$$Yo_i-(k \times Y1_i)=Ys_i/M \tag{2}$$

$$\eta=\{(k-1)\times(\beta+\xi)-1\}\times\beta/\{\xi\times(k-1)\} \tag{3}$$

in which k: a value which is obtained by dividing a distance between each element and a first principal point of the lens in the lens array corresponding to each element by $f_1$;

$\beta$: a value which is obtained by dividing the focal length $f_2$ of the image forming lens by $f_1$;

$\xi$: a value which is obtained by dividing a distance obtained by subtracting the focal lengths $f_1$ and $f_2$ from a distance between a second principal point of each lens of the lens array and a first principal point of the image forming lens by $f_1$;

$\eta$: a value which is obtained by dividing a distance between a second principal point of the image forming lens and the detecting surface by $f_1$;

M: a magnification of an optical system constituted of the lens array and the image forming lens, represented by $M=-\beta/\{1+(1-k)\times\xi\}$; and X, Y axes: coordinate axes having directions perpendicular to an optical axis direction (Z-axis direction) of the lenses constituting the lens array and being orthogonal to each other, each coordinate of $(Xo_i, Yo_i)$, $(X1_i, Y1_i)$ and $(Xs_i, Ys_i)$ being on the basis of the common X and Y coordinate axes.

As aforementioned, since the image of each element can be formed in an arbitrary position on an examining surface, plural elements can be observed once. Moreover, by determining each parameter in the above expression (3), even if the lens of the same focal distance is used, the magnification of the optical system can be changed. Additionally, by changing the sign of the magnification, an erected or inverted element image can be freely selected.

In the array element examination method, when the light from each element is formed into the image on substantially the identical point within the detecting surface, the measurement system can be constituted without any movable section, and a highly precise position detection can be performed. Moreover, when the optical system constituted of the lens array and the image forming lens is arranged to be an afocal system, then $\xi=0$. The magnification M then does not depend on k or is not influenced by an error of k. Since it then becomes difficult to be influenced by errors, an accurate measurement can be made. Moreover, in the array element examination method, if the lights from the array element are fetched as substantially parallel lights by the lens array (i.e., tandem arrangement of k=1), parallel lights are obtained between the lens array and the image forming lens. An accurate measurement system, which does not depend on the magnitude of $\xi$ and further is not influenced by errors, can then be constructed. Furthermore, if $\xi=0$ and k=1, then a more accurate measurement can be made.

A first array element examination device of the present invention is a device for performing the first array element examination method. The array element examination device for detecting positions of plural elements arranged in an array state is provided with a lens array having plural lenses corresponding to the plural elements and having optical axes arranged substantially parallel with one another, at least one image forming lens for forming an image of a light from each lens of the lens array within a light receiving region of a optical detector or a detecting means, a detecting means for detecting the formed image of the element and an arithmetic operation circuit for obtaining the position of each element from a detection signal of the detecting means. The lens array, the image forming lens and the detecting means are arranged in such a manner that the light from each lens of the lens array is formed into the image within the light receiving region of the detecting means.

The element image is preferably photographed with, for example, a CCD camera or detected with a split-type photo diode. Since lights of plural elements are formed into images within the light receiving region of the detecting means, a measurement system constituted of the lens array, the image forming lens, the detecting means and the arithmetic operation circuit does not require any movable section. Therefore, positions can be detected with high precision.

Moreover, a second array element examination device of the present invention is a device for performing the second array element examination method. In the first array element examination device for detecting the position of the array element in which plural elements have optical axes substantially parallel with one another and are arranged in an array state in such a manner that the coordinate of the i-th element (where i=1 to N, N denotes the number of elements) in the plane perpendicular to the optical axes is represented by $(Xo_i, Yo_i)$, there are provided a lens array in which plural lenses corresponding to the plural elements and having focal lengths $f_1$ equal to the substantially mutually parallel optical axes are arranged in such a manner that the coordinate of the optical axis of the i-th lens in a plane perpendicular to the optical axis of each lens is represented by $(X1_i, Y1_i)$ and an image forming lens having a focal length $f_2$ for forming images of lights from the lens array in a plane of a detecting surface within a light receiving region of the detecting means.

Furthermore, by setting the arrangement of the lens array and the image forming lens relative to the plural elements in such a manner that relationships of the following expressions (1) to (3) are satisfied, the light from the i-th element among the plural elements is formed into the image in a desired position $(Xs_i, Ys_i)$ of the detecting surface by the i-th lens in the lens array and the image forming lens. The device is provided with the detecting means for detecting the formed image of each element and an arithmetic operation circuit for obtaining the position of each element from a detection signal of the detecting means.

$$Xo_i-(k \times X1_i)=Xs_i/M \quad (1)$$

$$Yo_i-(k \times Y1_i)=Ys_i/M \quad (2)$$

$$\eta=\{(k-1)\times(\beta+\xi)-1\}\times\beta/\{\xi\times(k-1)-1\} \quad (3)$$

in which k: a value which is obtained by dividing a distance between each element and a first principal point of the lens in the lens array corresponding to each element by $f_1$;

$\beta$: a value which is obtained by dividing the focal length $f_2$ of the image forming lens by $f_1$;

$\xi$: a value which is obtained by dividing a distance obtained by subtracting the focal lengths $f_1$ and $f_2$ from a distance between a second principal point of each lens of the lens array and a first principal point of the image forming lens by $f_1$;

$\eta$: a value which is obtained by dividing a distance between a second principal point of the image forming lens and the detecting surface by $f_1$;

M: a magnification of an optical system constituted of the lens array and the image forming lens, represented by $M=-\beta/\{1+(1-k)\times\xi\}$; and X, Y axes: coordinate axes having directions perpendicular to an optical axis direction (Z-axis direction) of the lenses constituting the lens array and being orthogonal to each other, each coordinate of $(Xo_i, Yo_i)$, $(X1_i, Y1_i)$ and $(Xs_i, Ys_i)$ being on the basis of the common X and Y coordinate axes.

In the array element examination device, a screen is disposed on a plane of the array-element image formed by the image forming lens, and the image projected on the screen is preferably photographed. By disposing the screen on the plane of the array-element image formed by the image forming lens and photographing the image projected on the screen, a clear image can be detected.

The array element examination device is preferably constituted in such a manner that the element as the examination object and the corresponding array lens are arranged close to each other. The close arrangement of the detection object or element and the corresponding array lens facilitates the positioning when setting the element.

In the array element examination device, between the plural elements and the lens array and/or between the lens array and the image forming lens, i.e., before and/or behind the lens array, an opening is preferably disposed for selectively passing the light from only one element among the plural elements. By disposing the movable opening before and/or behind the lens array, the position of each element can be detected.

In the array element examination device, a wavelength filter is disposed before and/or behind the lens array, and further a filter whose transmission wavelength is variable is preferably disposed before the detecting means. By disposing the wavelength filter before and/or behind the lens array corresponding to each element, the element can be identified by color. Furthermore, by disposing the filter whose transmission wavelength is variable before the detecting means, the detecting means may be a monochromatic detector.

In the array element examination device, instead of the filter whose transmission wavelength is variable, a variable wavelength light source is preferably used as a lighting means for transmitting or reflecting lights to the array element. Even when the variable wavelength light source is used as the lighting means for transmitting or reflecting lights to plural elements as the examination objects instead of the variable wavelength filter, the same effect can be obtained.

In the array element examination device, diffractive lenses are preferably used in the lens array. By using the diffractive lenses in the lens array, a degree of freedom in design is increased as compared with the refractive lenses.

In the array element examination device, an off-axis optical system is preferably used partially in the lens array. By using the off-axis optical system in a part of the lens array, a lens with a larger F number can be obtained. A measurement with a brightness and a high resolution can be realized.

In the array element examination device, it is preferable that the array element is a fiber array and a monochromatic or white light is radiated from an end face opposite to the fiber as the lighting means. When the examination object is the optical fiber array, and the monochromatic or white light is radiated from the end face opposite to the fiber as the lighting means and a light emitted from the examination end face is detected, a core position can be obtained more accurately.

In the array element examination device, a split-type photo diode is preferably used as an image detecting means. When the split-type photo diode is used as the image detecting means, biasing of each image can be seen by taking a difference in the quantity of light detected by each photo diode. Therefore, detection can be performed remarkably inexpensively and at a higher rate as compared with the image processing which requires a complicated arithmetic operation.

BRIEF DESCRIPTION OF THE DRAWINGS

FIG. 6 is a front view showing an embodiment of an objective lens as seen from an optical axis direction.

FIG. 10 shows an embodiment in which by adjusting the arrangement of each lens of the lens array, an end-face image of each fiber is formed in a different position of a detecting surface.

DESCRIPTION OF THE PREFERRED EMBODIMENTS

Embodiments of the present invention will be described with reference to the accompanying drawings.

Figure 1:
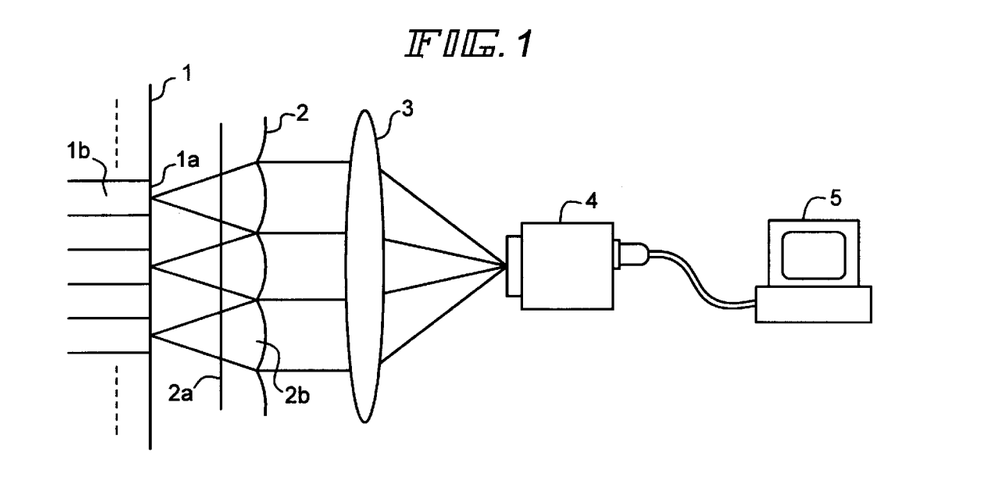
FIG. 1 is a schematic diagram showing an embodiment of an array element examination device according to the present invention.

FIG. 1 is a schematic diagram of an array element examination device of the present invention, having a lens array 2, an image forming lens 3, a CCD camera 4 and a computer 5 as an arithmetic operation circuit provided with a display device.

Figure 8:
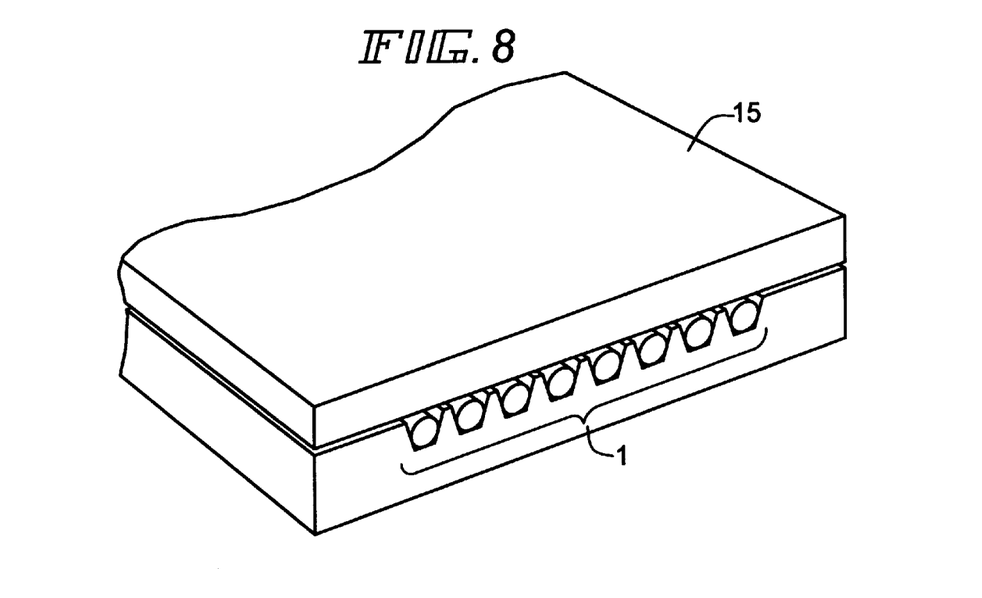
FIG. 8 is a perspective view showing a main portion of an embodiment of a fiber array block as an examination object.

An examination object is a fiber array 1 in which array elements with a diameter of 125 $\mu$m are arranged at a pitch of 250 $\mu$m in a row. FIG. 8 shows an appearance of a fiber array block 15 constituting the fiber array 1.

The lens array 2 uses integrally arranged refractive lenses as objective lenses for making parallel lights from the fiber array 1. Therefore, pitch precision levels of lenses 2b constituting the lens array 2 are secured at the same degrees as those of fibers 1b of the fiber array 1. The lens array 2 is prepared by etching a quartz substrate using a lithography technique, and has a pitch of 250 $\mu$m, a diameter of 246 $\mu$m and a focal length of 2 mm. By using the lithography technique, a precision with a pitch error of 0.1 $\mu$m or less can be obtained. A fiber end face 1a is set on a focal plane of the lens array 2.

For the image forming lens 3, an achromatic lens with a focal length of 40 mm and a diameter of 30 mm is used. The CCD camera 4 is disposed as the image detecting means on an image-side focal position. A fiber end-face image is formed in a light receiving region of the CCD camera 4, and more specifically on the substantially identical point on a photographing surface by the corresponding lens array 2 and the image forming lens 3. The magnification is determined by the ratio of the focal lengths of the lens array 2 and the image forming lens 3, and is 20 times in this embodiment. A picture element size of the CCD camera 4 is 11×13 $\mu$m, and a resolution per picture element is 0.55 or 0.65 $\mu$m. Furthermore, by an image processing in the computer 5, an interpolation processing, is performed to obtain a resolution of one tenth of the above value. By the image processing an image forming position is obtained in a unit of one picture element, and the picture element unit is converted to a length unit based on the picture element size, and further a relative position of the image forming position obtained in the length unit is obtained. If the fiber array 1 is arranged accurately at the pitch of 250 μm, all fiber end-face images are formed on the identical point, but if there is a pitch error in the fiber array 1, deviation is made 20 times larger when forming the image. Through the processing in the computer 5, it is determined whether or not the fiber array 1 is good. Additionally, the arithmetic operation results and the images of the fibers 1b are displayed on the display device of the computer 5.

In the embodiment, the image formed by the image forming lens 3 is taken directly by the CCD camera 4. A magnifying optical system, e.g., a lens, may be inserted between the image forming lens and the CCD camera. In this case, the resolution can be enhanced.

Figure 2:
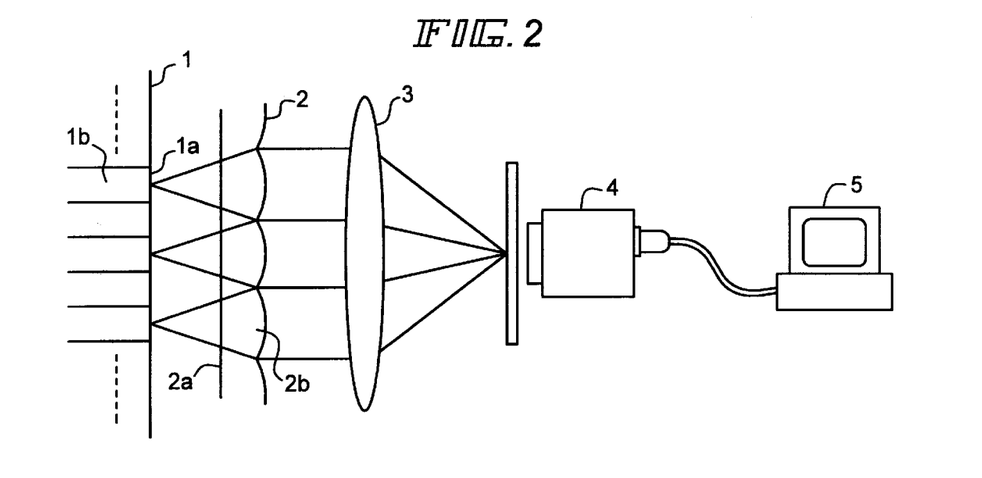
FIG. 2 is a schematic diagram showing an embodiment in which a screen is disposed behind an image forming lens.

Alternatively, as shown in FIG. 2, a screen 16 may be disposed on a first image plane of the image forming lens 3 to photograph an image on the screen. By photographing the image projected on the screen, a clearer image can be detected.

While the embodiment uses a constitution in which a focal position of the lens array 2 is outside a lens substrate 2a constituting the lens array 2, it may instead use a constitution which is prepared in such a manner that a focus is on a substrate surface and that the end face 1a of the fiber array 1 is close to the lens substrate 2a. In this constitution, when the elements, as the measurement objects, are set, positioning/alignment is facilitated. Moreover, since each fiber 1b is disposed in the focal position of the corresponding lens 2b, images can be formed on the identical point with a simple optical system.

Figure 3:
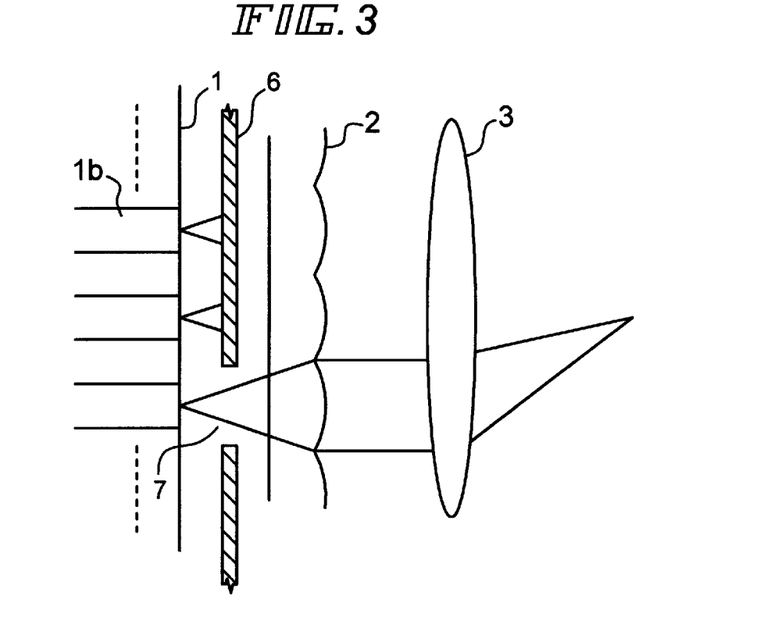
FIG. 3 is a schematic diagram showing an embodiment in which a shielding plate provided with an opening is movably disposed before a lens array.

In the above embodiment, the case where the images of all the fibers 1b are simultaneously formed has been described. However, as shown in FIG. 3 for example, a shielding plate 6 provided with one opening 7 may be movably disposed in a direction orthogonal to optical axes between the fiber array 1 and the lens array 2, so that the images of the fibers 1b are formed one by one by using the opening 7 of the shielding plate 6. Thereby, the position of each fiber 1b can be measured. Additionally, by providing plural openings, positions of plural fibers can be measured. Moreover, the opening may be formed between the lens array 2 and the image forming lens 3. Specifically, a pin hole may be formed as the opening.

Figure 4:
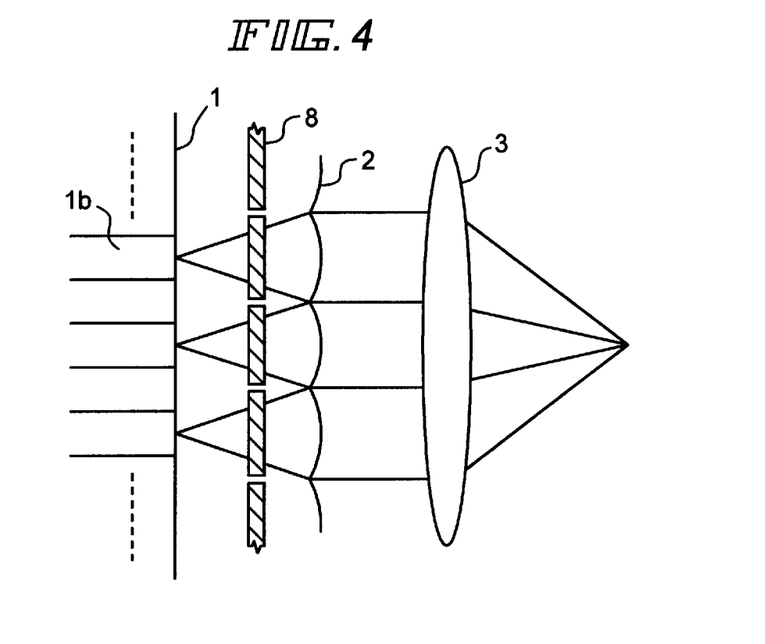
FIG. 4 is a schematic diagram showing an embodiment of the array element examination device in which a wavelength filter is disposed before the lens array.
Figure 5:
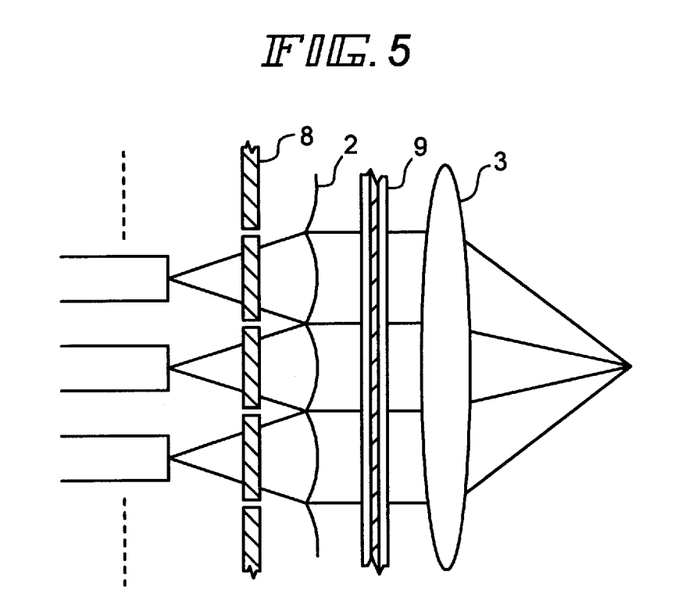
FIG. 5 is a schematic diagram showing an embodiment of the array element examination device in which the wavelength filter is disposed before the lens array and a variable wavelength filter is disposed behind the lens array.

Alternatively, as shown in FIG. 4, a wavelength filter 8 whose wavelength differs with each fiber 1b is disposed before the lens array 2, and the using of the wavelength filter 8 enables each fiber 1b to be distinguished by color. (Additionally, the wavelength filter 8 may be disposed behind the lens array 2.) Furthermore, as shown in FIG. 5, when a variable wavelength filter 9 is used between the lens array 2 and the image forming lens 3, the fiber 1b can be identified even by a monochromatic CCD camera by controlling a transmission wavelength. The variable wavelength filter 9 can be constituted of a liquid crystal filter. Moreover, instead of disposing the variable wavelength filter 9 between the lens array 2 and the image forming lens 3 as aforementioned, a variable wavelength light source (not shown) may be used as a lighting means for transmission or reflection for the elements to light the elements.

Figure 6A:
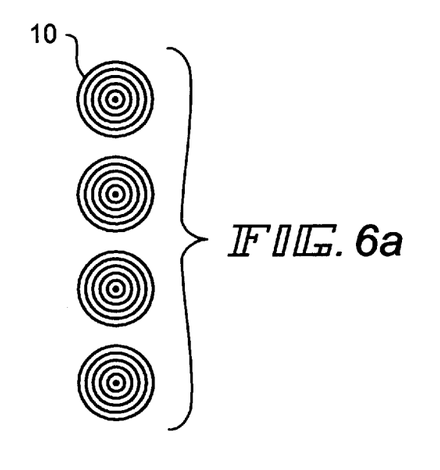
FIG. 6A shows a normally arranged optical system.
Figure 6B:
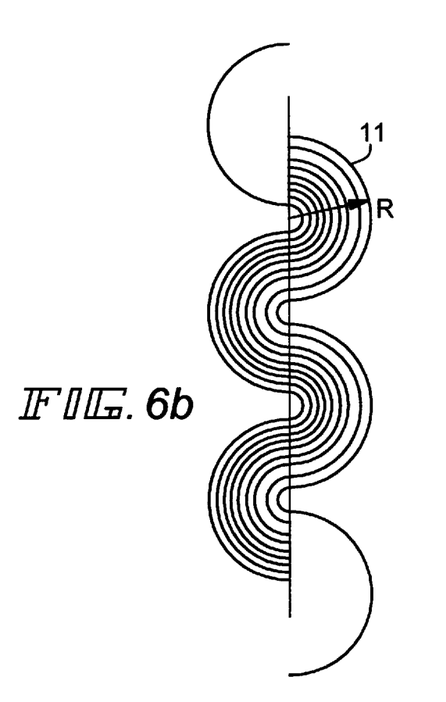
FIG. 6B shows an off-axis optical system.

In the embodiment, the case where the refractive lenses are used as the objective lenses has been described. In order to obtain a higher light converging efficiency, diffractive lenses 10 as shown in FIG. 6A may be used. The using of the diffractive lenses increases the degree of freedom in design as compared with the refractive lenses. Alternatively, an off-axis optical system can be used in which an image, with a little fluctuation in light quantity, can be formed with good contrast. FIG. 6B shows an example of the off-axis optical system in which binary lenses 11 are used. A radius R of the binary lens 11 is made about twice as large as that of the lens 10 of FIG. 6A to enlarge the lens area. Additionally, the lens is divided into semicircles. The semicircular binary lenses 11 are alternately arranged on opposite sides along a straight line connecting optical axes, the optical axes corresponding to the fibers being substantially parallel with one another. By using the binary lenses 11 as the objective lenses of the off-axis optical system in this manner, the F number can be enlarged, and a measurement with a brightness and a high resolution can be realized. Additionally, the off-axis optical system can be used in a part of the lens array, and not in the entire lens array.

Figure 7:
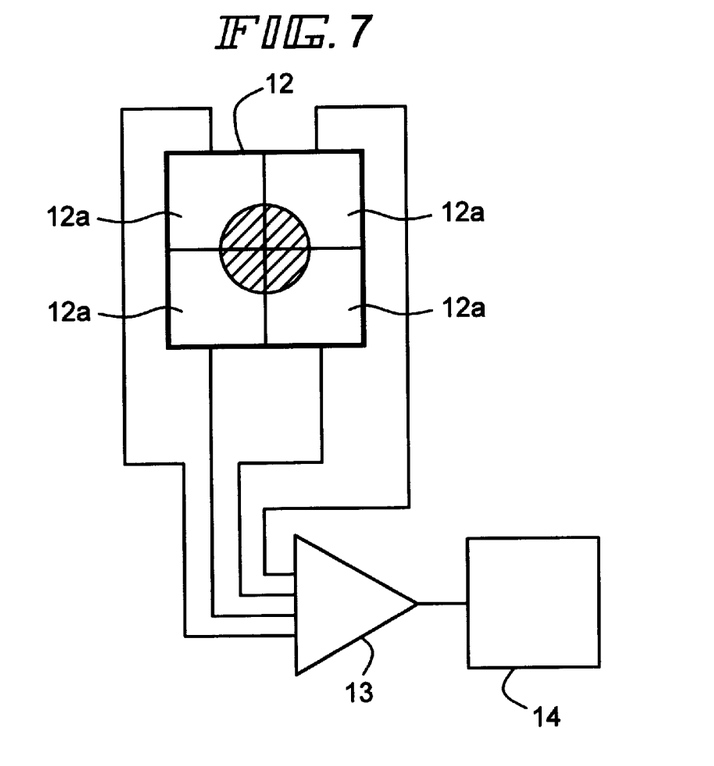
FIG. 7 is a schematic diagram showing an embodiment in which a split-type photo diode is used as an optical detector or a detecting means.

An object to be examined can be opaque, but in the case where an optical fiber permeable to light is to be examined, a light (monochromatic or white light) is radiated from a side opposite to an examining surface, and an emitted light is formed into an image. Thereby, a core position can be detected more accurately. Especially, in this case, the structure is simplified by using a split-type photo diode or another beam position detecting means. For example, as shown in FIG. 7, the image of each optical fiber is formed on a midpoint (equivalent to the identical point) of a four split type photo diode 12. A difference in quantity of light received from each optical fiber detected by each photo diode 12a is taken by a comparator 13. Comparison result is then entered into an arithmetic operation circuit 14, and the biasing of each optical fiber from the identical point is examined from the difference of received light quantity. The structure is as compared with the image processing structure, and positions can be detected at a higher rate and less.

Figure 9:
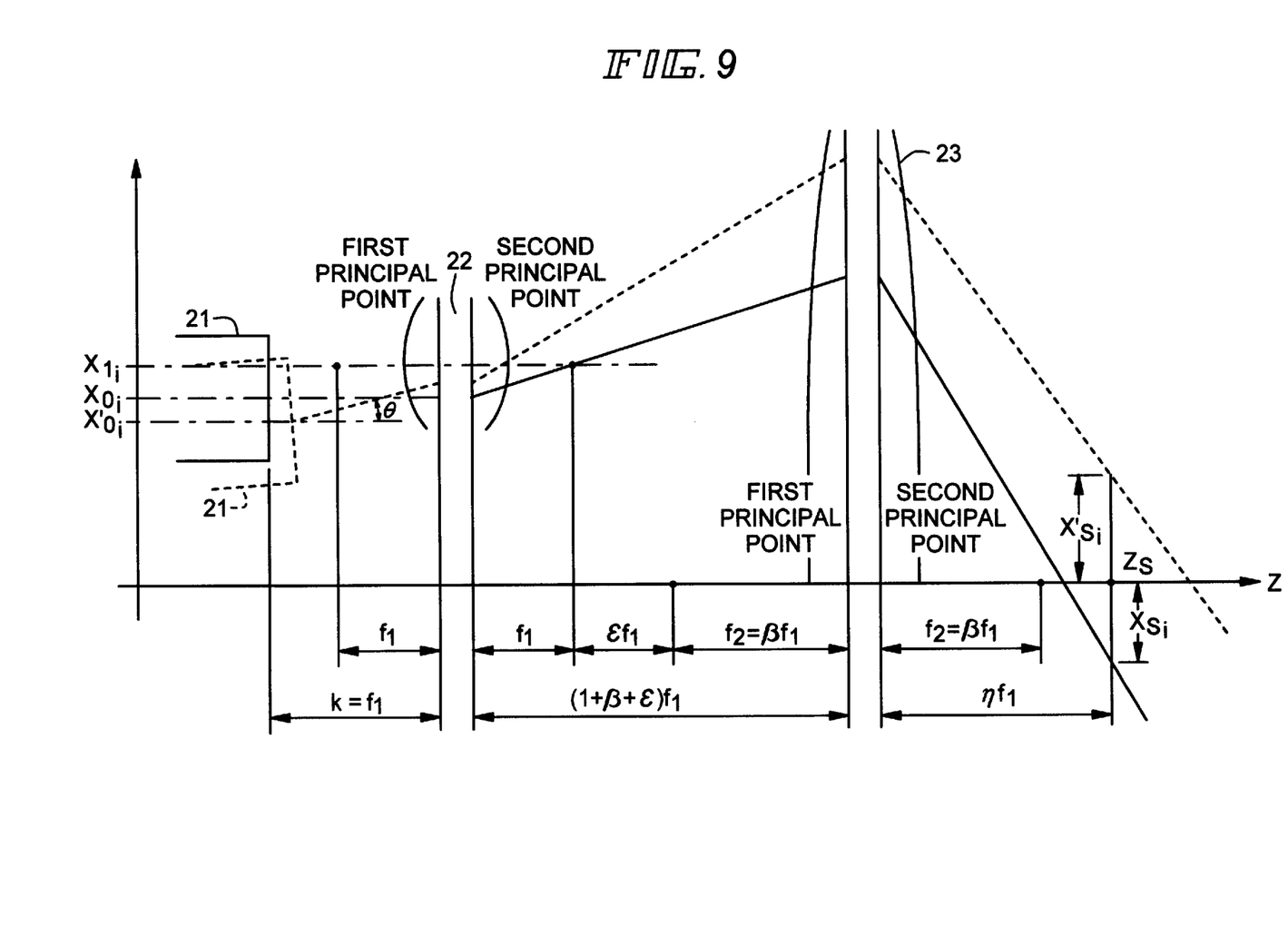
FIG. 9 shows each parameter of the optical system in an embodiment of the array element examination device according to the present invention.

Another embodiment of the present invention will now be described. FIG. 9 shows each parameter in the optical system of the array element examination device. In the embodiment, an image of each fiber 21 of a fiber array as an examination object is formed by each corresponding lens 22 of a lens array and an image forming lens 23. The position of the formed image of the fiber 21 is obtained by using a CCD camera and a computer in the same manner as aforementioned. Additionally, FIG. 9 only shows one fiber 21 of the fiber array and one opposed lens 22 of the lens array.

Assume that the number of fibers 21 arranged in a row to form the fiber array is eight and the coordinate of the i-th fiber 21 (where i=1 to 8, and the fiber 21 on one end is the first fiber) is $(Xo_i, Yo_i)$. Moreover, the coordinate of the i-th lens 22 of the lens array, which is opposed to the i-th fiber 21, is $(X1_i, Y1_i)$.

Furthermore, each lens 22 of the lens array and the image forming lens 23 are arranged relative to each fiber 21 of the fiber array in such a manner that relationships of the following expressions (1) to (3) are substantially satisfied, a light from the i-th fiber 21 is fetched by the i-th lens 22 and the fetched light is formed into an image in a desired position $(Xs_i, Ys_i)$ of an image forming plane by the image forming lens 23. (Here, X-Y axes are coordinate axes having directions perpendicular to an optical axis direction (i.e. Z-axis direction) of the image forming lens 23 and being orthogonal to each other, and each coordinate of $(Xo_i, Yo_i)$, $(X1_i, Y1_i)$ and $(Xs_i, Ys_i)$ is on the basis of the common X-Y coordinate axes.)

$$Xo_i - (k \times X1_i) = Xs_i/M \quad (1)$$

$$Yo_i - (k \times Y1_i) = Ys_i/M \quad (2)$$

$$\eta = \{(k-1) \times (\beta + \xi) - 1\} \times \beta / \{\xi \times (k-1) - 1\} \quad (3)$$

in which k: a value which is obtained by dividing a distance between each element and a first principal point of the lens in the lens array corresponding to each element by $f_1$;

β: a value which is obtained by dividing the focal length $f_2$ of the image forming lens by $f_1$;

ξ: a value which is obtained by dividing a distance obtained by subtracting the focal lengths $f_1$ and $f_2$ from a distance between a second principal point of each lens of the lens array and a first principal point of the image forming lens by $f_1$;

η: a value which is obtained by dividing a distance between a second principal point of the image forming lens and the detecting surface by $f_1$; and M: a magnification of an optical system constituted of the lens array and the image forming lens, represented by $M=-\beta/\{1+(1-k)\times\xi\}$. All the distances in the Z-axis direction are standardized with the focal length $f_1$ of the lens 22 as aforementioned. Additionally, the expression (3) satisfies a condition that an image forming point becomes constant even if the light from the element is inclined relative to the Z-axis instead of being parallel therewith.

In FIG. 9, a light beam shown by a solid line is a locus of an ideal light beam when the components are arranged according to designed values, while a light beam shown by a broken line is a locus of a light beam when the fiber 21 is deviated from its correct position (at this time the coordinate of the i-th fiber 21 is a locus of a light beam $(X'o_i, Y'o_i)$).

The fiber array of the embodiment is the arrangement of the fiber 21 with a diameter of 125 μm at a pitch of 250 μm in the same manner as in the embodiment of FIG. 1. The lens array is also provided with the lens 22 with a diameter of 246 mm and a focal length of 3 mm arranged at a pitch of 250 μm, and prepared with a pitch error of 0.1 μm or less by a lithography technique. Furthermore, in the embodiment, the end face of the fiber 21 is set on the focal plane of the lens 22 (therefore, k=1). Additionally, the lens having a focal length of 300 mm is used as the image forming lens 23 and the CCD camera is installed in the image-side focal position of the image forming lens. Furthermore, ξ is about −130 (additionally, ξ can be determined irrespective of the expressions (1) to (3), and the optical system can be miniaturized by making ξ negative). The picture element size of the CCD camera is 11×13 μm in the same manner as the embodiment of FIG. 1, and the resolution per picture element is 0.11 or 0.13 μm. Furthermore, the interpolation processing is performed in the computer to obtain a resolution of one tenth of the above value.

The end-face image of each fiber 21 is formed substantially in the center position on the photographing surface of the CCD camera by the corresponding lens 22 and the image forming lens 23. Because of the tandem arrangement of k=1, the magnification M is determined by the ratio $f_2/f_1$ of the focal lengths of the lens 22 and the image forming lens 23, and is 100 times in the embodiment.

If the fibers 21 of the fiber array are arranged accurately at the pitch of 250 μm, all the end-face images of the fibers 21 are formed on the identical point, but if there is a pitch error in the fiber 21, the image is formed in a position deviated by a distance which is 100 times longer than the error quantity (refer to the expressions (1) and (2)). (Additionally, if k=1, the error by the optical system can be suppressed to 0.02 μm or less.) To separate the image of each fiber 21, a slit is formed on the incident side of the fiber 21, so that a light is radiated only to one fiber 21 once. By scanning the slit, the position of each fiber is successively detected. Through the image processing in the computer, it is determined whether or not each fiber of the fiber array is good.

Figure 10A:
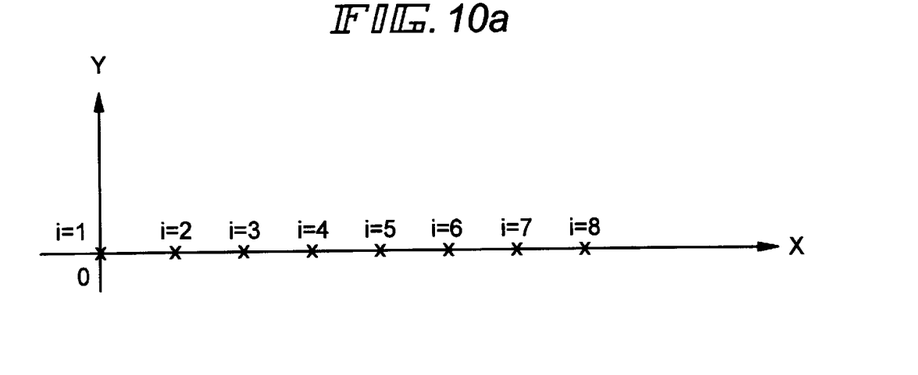
FIG. 10A shows the arrangement of each lens of the lens array.

FIG. 10 shows an embodiment in which by adjusting the arrangement of each lens 22 of the lens array, the end-face image of each fiber 21 is formed in a different position of the detecting surface. In the embodiment, as shown in FIG. 10A, each lens 22 of the lens array is arranged at a constant pitch of about 250 μm in an X-axis direction to be opposed to each fiber 21 in the same manner as in the above embodiment, but each lens 22 is not positioned accurately at the constant pitch. Positions of eight lenses 22 are slightly deviated in X and Y directions from constant pitch positions (0 μm, 0 μm), (250 μm, 0 μm), (500 μm, 0 μm), etc. Specifically, the position coordinate of the first lens 22 is set to (0–15 μm, 10 μm), and the position coordinates of the second to eighth lenses 22 are (250–15 μm, −10 μm), (500–7.5 μm, 0 μm), (750 μm, 10 μm), (1000 μm, −10 μm), (1250+7.5 μm, 0 μm), (1500+15 μm, 10 μm) and (1750+15 μm, −10 μm), respectively. The other conditions are the same as those of the embodiment of FIG. 9.

Figure 10B:
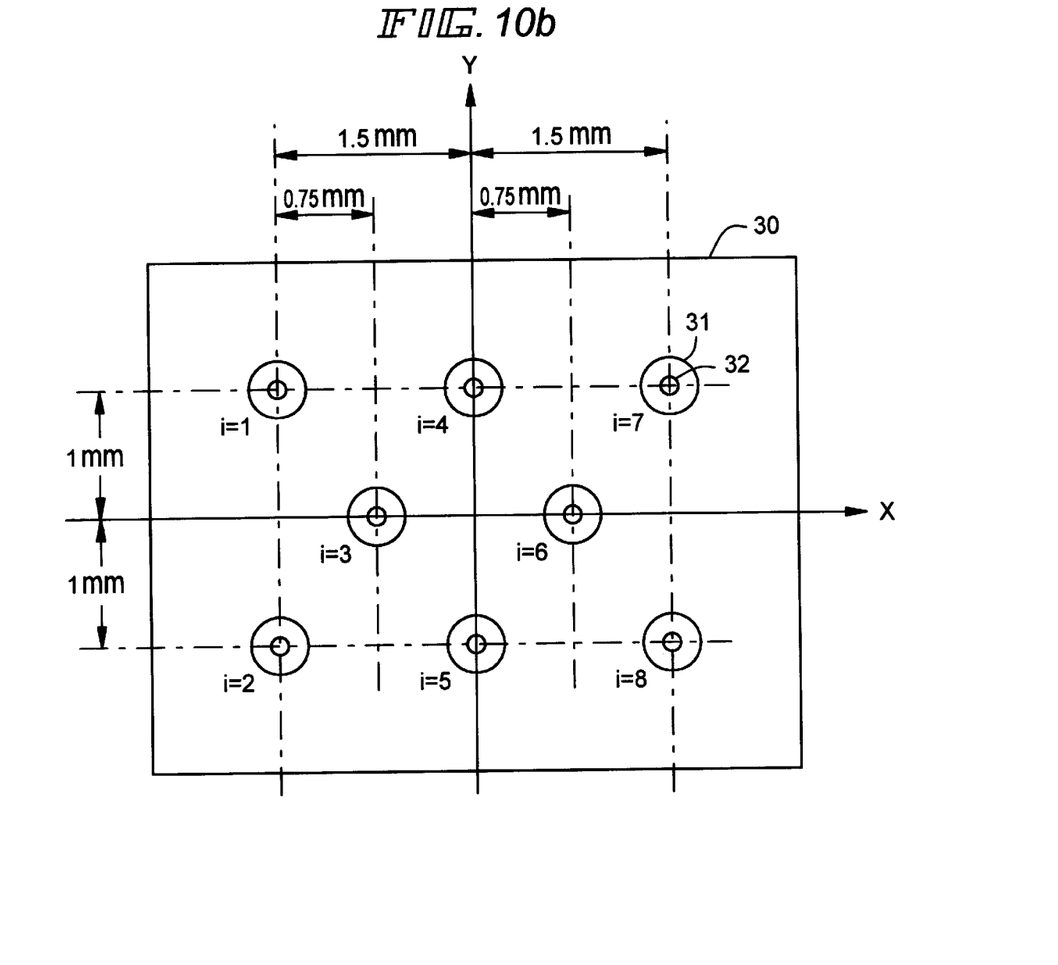
FIG. 10B shows an end-face image of each fiber dispersed and formed on a photographing surface.

If the lenses 22 are accurately arranged in the constant pitch positions and the positions of the fibers 21 are not deviated, the image of each fiber 21 is formed in the central position (point C of FIG. 10B) of a photographing surface (detecting surface) 30 of the CCD camera. In the embodiment, however, since the positions of the lenses 22 are deviated from the constant pitch positions as aforementioned, an end-face image 31 of each fiber 21 (32 denotes a core image) is dispersed and formed as shown in FIG. 10B. For example, when the image forming position of the first fiber 21 is considered, the position of the first lens 22 opposed to the fiber 21 (with no position deviation) is deviated by −15 μm in the X direction and +10 μm in the Y direction from the constant pitch position. Therefore, $Xs_1 = -100\times(Xo_1-X1_1)$ and $Ys_1=-100\times(Yo_1-Y1_1)$ result from the expressions (1) and (2), and the image is formed in a position which is deviated by −1.5 mm in the X direction and +1.0 mm in the Y direction from the point C in the center position of the photographing surface 30. Since the fiber images 31 are dispersed and formed on the photographing surface 30 in this manner, eight images can be simultaneously observed. There is no need for moving the slit or the like as in the above embodiment.

Additionally, while one image forming lens is used in the aforementioned embodiments, plural lenses may be combined to form the image forming lens. In this case, by considering one image forming lens synthesized by plural lenses, the present invention can be applied.

Moreover, while the fibers of the fiber array are arranged at equal intervals in the embodiment, they may be arranged at unequal intervals. Besides the fiber, a semiconductor laser, a light emitting diode or the like may be used as the examination object. Furthermore, different types of objects may be arranged.

As aforementioned, according to the array element examination method of the present invention, the image of each array element is formed in the predetermined position (the substantially identical point) within the light receiving region of the detecting means or in the desired arrangement. Therefore, examination can be performed with a high resolution and in a broad range. Furthermore, it can be examined from the position deviation quantity of the formed element image relatively inexpensively whether or not the array element is good. Especially, if images of lights from plural elements are formed on the substantially identical point, it can be easily determined by the image position deviation whether or not there is a pitch error or the like in plural elements. Moreover, if each element image is formed in the desired arrangement on the examination surface, plural elements can be observed once.

According to the array element examination device of the present invention, since the images of lights from plural elements are formed in the predetermined position (the substantially identical point) within the light receiving region of the detecting means or in the desired arrangement, the measurement system constituted of the lens array, the image forming lens, the detecting means and the arithmetic operation circuit and provided with no movable sections can be constructed. As a result, a highly precise position detection can be achieved with a simple

What is claimed is:

1. An array element examination method for detecting a position of an array element in which plural elements have optical axes substantially parallel with one another and are arranged in an array state so that the coordinate of the i-th element (where i=1 to N, N being the number of elements) in a plane perpendicular to said optical axes is represented by $(Xo_i, Yo_i)$, comprising the steps of:

providing a lense array in which plural lenses corresponding to said plural elements and having focal lengths $f_i$ equal to the substantially mutually parallel optical axes are arranged so that the coordinate of the optical axis of the i-th lens in the plane perpendicular to the optical axis of said each lens is represented by $(X1_i, Y1_i)$ and an image forming lense having a focal length $f_2$ for forming the image of the light from each lens of the lens array, when the lens array and the image forming lense form the image of each element within a plane of a detecting surface in the light receiving region of said optical detector which is perpendicular to the optical axes of the lenses constituting said lens array, arranging the lens array and the image forming lens relative to the plural elements so that relationships of the following expressions (1) to (3) are satisfied and fetching the light from the i-th element among said plural elements by the i-th lens in said lens array, and forming an image of the fetched light in a desired position $(Xs_i, Ys_i)$ of said detecting surface by the image forming lens;

detecting each element image formed by said image forming step, and obtaining the position of each element from the detection signal obtained by said step:

$$Xo_i-(k \times X1_i)=Xs_i/M \quad (1)$$

$$Yo_i-(k \times Y1_i)=Ys_i/M \quad (2)$$

$$\eta=\{(k-1)\times(\beta+\xi)-1\}\times\beta/\{\xi\times(k-1)-1\} \quad (3)$$

in which k: a value which is obtained by dividing a distance between each element and a first principal point of the lens in the lens array corresponding to said each element of $f_1$;

β: a value which is obtained by dividing the focal length $f_2$ of the image forming lens by $f_1$;

ξ: a value which is obtained by dividing a distance obtained by subtracting the focal lengths $f_1$ and $f_2$ from a distance between a second principal point of each lens of the lens array and a first principal point of the image forming lens by $f_1$;

η: a value which is obtained by dividing a distance between a second principal point of the image forming lens and the detecting surface by $f_1$;

M: a magnification of an optical system constituted of the lens array and the image forming lens, represented by $M=-\beta/\{1+(1-k)\times\xi\}$; and X, Y axes: coordinate axes having directions perpendicular to an optical axis direction (Z-axis direction) of the lenses constituting the lens array and being orthogonal to each other, each coordinate of $(Xo_i, Yo_i)$, $(X1_i, Yo_i)$ and $(Xs_i, Ys_i)$ being on the basis of the common X and Y coordinate axes.

2. An array element examination device for detecting a position of an array element in which plural elements have optical axes substantially parallel with one another and are arranged in an array state so that the coordinate of the i-th element (where i=1 to N, N being the number of elements) in the plane perpendicular to said optical axes is presented by $(Xo_i, Yo_i)$, comprising:

a lens array in which plural lenses corresponding to said plural elements and having focal lengths $f_1$ equal to the substantially mutually parallel optical axes are arranged so that the coordinate of the optical axis of the i-th lens in a plane perpendicular to the optical axis of each lens is represented by $(X1_i, Y1_i)$;

at least one image forming lens having a focal length $f_2$ for forming images of lights from said lens array in a plane of a detecting surface within the light receiving region of an optical detector which is perpendicular to the optical axes of the lenses constituting said lens array;

said optical detector for detecting each element image which is formed by setting the arrangement of said lens array and the image forming lens relative to said plural elements so that relationships of the following expressions (1) to (3) are satisfied, so that the image of the light from the i-th element among said plural elements is formed in a desired position $(Xs_i, Ys_i)$ of said detecting surface by the i-th lens in said lens array and the image forming lens; and an arithmetic operation circuit for obtaining the position of each element from the detection signal of said optical detector:

$$Xo_i-(k \times X1_i)=Xs_i/M \quad (1)$$

$$Yo_i-(k \times Y1_i)=Ys_i/M \quad (2)$$

$$\eta=\{(k-1)\times(\beta+\xi)-1\}\times\beta/\{\xi\times(k-1)-1\} \quad (3)$$

in which k: a value which is obtained by dividing a distance between each element and a first principal point of the lens in the lens array corresponding to each element by $f_1$;

β: a value which is obtained by dividing the focal length $f_2$ of the image forming lens by $f_1$;

ξ: a value which is obtained by dividing a distance contained by subtracting the focal lengths $f_1$ and $f_2$ from a distance between a second principal point of each lens of the lens array and a first principal point of the image forming lens by $f_1$;

M: a magnification of an optical system constituted of the lens array and the image forming lens, represented by $M=-\beta/\{1+(1-k)\times\xi\}$; and X, Y axes: coordinate axes having directions perpendicular to an optical axis direction (Z-axis direction) of the lenses constituting the lens array and being orthogonal to each other, each coordinate of (($Xo_i$, $Yo_i$), ($X1_i$, $Y1_i$) and ($Xs_i$, $Ys_i$) being on the basis of the common X and Y coordinate axes.

3. An array element examination device for detecting positions of plural elements arranged in an array state, comprising:

a lens array having plural lenses with optical axes corresponding to said plural elements arranged substantially parallel with one another;

at least one image forming lens for forming an image of a light from each lens of said lens array within a light receiving region of an optical detector;

said optical detector for detecting the formed image of the element; and an arithmetic operation circuit for obtaining the position of each element from a detection signal of said optical detector;

said lens array, said image forming lens and said optical detector being arranged so that the image of the light from each lens of said lens array is formed within the light receiving region of said optical detector, wherein between said plural elements and the lens array and/or between the lens array and the image forming lens, an opening is disposed for selectively passing the light from only one element among said plural elements.

4. An array element examination method for detecting positions of plural elements arranged in an array state by using an optical detector, comprising the following steps:

fetching lights from said plural elements by a lense array which has plural lenses having optical axes corresponding to the elements arranged substantially parallel with one another;

forming an image of a light from each lens of said lens array within a light receiving region of said optical detector by an image forming lense;

detecting the element image formed at said step; and obtaining a position of each element from a detection signal obtained by said step, wherein plural elements have optical axes substantially parallel with one another and are arranged in an array state so that the coordinate of the i-th element (i=1 to N, N being the number of elements) in a plane perpendicular to said optical axes is represented by ($Xo_i$, $Yo_i$), comprising the steps of:

providing a lense array in which plural lenses corresponding to said plural elements and having focal lengths $f_1$ equal to the substantially mutually parallel optical axes are arranged so that the coordinate of the optical axis of the i-th in the plane perpendicular to the optical axis of said each lens is represented by ($X1_i$, $Y1_i$,) and an image forming lense having a focal length $f_2$ for forming the image of the light from each lens of the lens array, when the lens array and the image forming lens form the image of each element within a plane of a detecting surface in the light receiving region of said optical detector which is perpendicular to the optical axes of the lenses constituting said lens array, arranging the lens array and the image forming lens relative to the plural elements so that relationships of the following expressions (1) to (3) are satisfied and fetching the light from the i-th element among said plural elements by the i-th lens in said lens array, and forming an image of the fetched light in a desired position ($Xs_i$, $Ys_i$) of said detecting surface by the image forming lens;

detecting each element formed by said image forming step;

obtaining the position of each element from the detection signal obtained by said detecting step:

$$Xo_i-(k \times X1_i)=Xs_i/M \qquad (1)$$

$$Yo_i-(k \times Y1_i)=Ys_i/M \qquad (2)$$

$$\eta=\{(k-1)\times(\beta+\xi)-1\}\times\beta/\{\xi\times(k-1)-1\} \qquad (3)$$

in which k: a value which is obtained by dividing a distance between each element and a first principal point of the lens in the lens array corresponding to said each element of $f_1$;

β: a value which is obtained by dividing the focal length $f_2$ of the image forming lens by $f_1$;

ξ: a value which is obtained by dividing a distance obtained by subtracting the focal lengths $f_1$ and $f_2$ from a distance between a second principal point of each lens of the lens array and a first principal point of the image forming lens by $f_1$;

η: a value which is obtained by dividing a distance between a second principal point of the image forming lens and the detecting surface by $f_1$;

M: a magnification of an optical system constituted of the lens array and the image forming lens, represented by $M=\beta/\{1+(1-k)\times\xi\}$; and X, Y axes: coordinate axes having directions perpendicular to an optical axis direction (Z-axis direction) of the lenses constituting the lens array and being orthogonal to each other, each coordinate of ($Xo_i$, $Yo_i$), ($X1_i$, $Yo_i$) and ($Xs_i$, $Ys_i$) being on the basis of the common X and Y coordinate axes.

5. The array element examination method according to claim 4 wherein the image of the light from said each element is formed on the substantially identical point of the detecting surface within the light receiving region of said optical detector.

6. The array element examination method according to claim 4 wherein an optical system constituted of said lens array and the image forming lens is arranged to form an afocal system.

7. The array element examination method according to claim 4 wherein the lights from said array element are fetched as substantially parallel lights by said lens array.

8. The array element examination method according to claim 4 wherein the plural elements arranged in the array are optical fibers.

9. An array element examination device for detecting positions of plural elements arranged in an array state, comprising:

a lens array having plural lenses with optical axes corresponding to said plural elements arranged substantially parallel with one another;

at least one image forming lens for forming an image of a light from each lens of said lens array within a light receiving region of an optical detector;

said optical detector for detecting the formed image of the element; and an arithmetic operation circuit for obtaining the position of each element from a detection signal of said optical detector;

said lens array, said image forming lens and said detecting means being arranged in such a manner that the image of the light from each lens of said lens array is formed within the light receiving region of said optical detector;

wherein plural elements have optical axes substantially parallel with one anther and are arranged in an array state so that the coordinate of the i-th element (i=1 to N, N being the number of elements) in the plane perpendicular to said optical axes is presented by $(Xo_i, Yo_i)$, further comprising:

a lens array in which plural lenses corresponding to said plural elements and having focal lengths $f_1$ equal to the substantially mutually parallel optical axes are arranged so that the coordinate of the optical axis of the i-th lens in a plane perpendicular to the optical axis of each lens is represented by $(X1_i, Y1_i)$;

an image forming lens having a focal length $f_2$ for forming images of lights from said lens array in a plane of a detecting surface within the light receiving region of said optical detector which is perpendicular to the optical axes of the lenses constituting said lens array;

said optical detector for detecting each element image which is formed by setting the arrangement of said lens array and the image forming lens relative to said plural elements so that relationships of the following expressions (1) to (3) are satisfied, so that the image of the light from the i-th element among said plural elements is formed in a desired position $(Xs_i, Ys_i)$ of said detecting surface by the i-th lens in said lens array and the image forming lens; and an arithmetic operation circuit for obtaining the position of each element from the detection signal of said optical detector, where:

$$Xo_i - (k \times X1_i) = Xs_i/M \qquad (1)$$

$$Yo_i - (k \times Y1_i) = Ys_i/M \qquad (2)$$

$$\eta = \{(k-1) \times (\beta + \xi) - 1\} \times \beta / \{\xi \times (k-1) - 1\} \qquad (3)$$

in which k: a value which is obtained by dividing a distance between each element and a first principal point of the lens in the lens array corresponding to each element by $f_1$;

$\beta$: a value which is obtained by dividing the focal length $f_2$ of the image forming lens by $f_1$;

$\xi$: a value which is obtained by dividing a distance obtained by subtracting the focal lengths $f_1$ and $f_2$ from a distance between a second principal point of each lens of the lens array and a first principal point of the image forming lens by $f_1$;

M: a magnification of an optical system constituted of the lens array and the image forming lens, represented by $M = -\beta/\{1+(1-k) \times \xi\}$; and X, Y axes: coordinate axes having directions perpendicular to an optical axis direction (Z-axis direction) of the lenses constituting the lens array and being orthogonal to each other, each coordinate of $((Xo_i, Yo_i), (X1_i, Y1_i)$ and $(Xs_i, Ys_i)$ being on the basis of the common X and Y coordinate axes.

10. The array element examination device according to claim 9 wherein a screen is disposed on an image plane of an array-element image formed by said image forming lens, and the element image projected on the screen is detected by said optical detector.

11. The array element examination device according to claim 9 wherein the element as an examination object and the corresponding lens array are arranged close to each other.

12. The array element examination device according to claim 9 wherein between said plural elements and the lens array and/or between the lens array and the image forming lens, an opening is disposed for selectively passing the light from only one element among said plural elements.

13. The array element examination device according to claim 9 wherein a wavelength filter is disposed at a position selected from the group consisting of between said plural elements and the lens array, between the lens array and the image forming lens, and between both, and a filter whose transmission wavelength is variable is further disposed before said optical detector.

14. The array element examination device according to claim 13 wherein a variable wavelength light source is used as a light source for performing transmission or reflection for the array element.

15. The array element examination device according to claim 14 wherein the array element is a fiber array, and the lighting means radiates a monochromatic or white light from an end face opposite to fibers.

16. The array element examination device according to claim 9 wherein diffractive lenses are used in said lens array.

17. The array element examination device according to claim 9 wherein an off-axis optical system is used partially in said lens array.

18. The array element examination device according to claim 9 wherein a split-type photo diode is used as the image optical detector.

19. An array element examination device for detecting positions of plural elements arranged in an array state, comprising:

a lens array having plural lenses with optical axes corresponding to said plural elements arranged substantially parallel with one another;

at least one image forming lens for forming an image of a light from each lens of said lens array within a light receiving region of an optical detector;

said optical detector for detecting the formed image of the element; and an arithmetic operation circuit for obtaining the position of each element from a detection signal of said optical detector;

said lens array, said image forming lens and said detecting means being arranged in such a manner that the image of the light from each lens of said lens array is formed within the light receiving region of said optical detector;

wherein between said plural elements and the lens array and/or between the lens array and the image forming lens, an opening is disposed for selectively passing the light from only one element among said plural elements.

20. An array element examination device for detecting positions of plural elements arranged in an array state, comprising:

a lens array having plural lenses with optical axes corresponding to said plural elements arranged substantially parallel with one another;

at least one image forming lens for forming an image of a light from each lens of said lens array within a light receiving region of an optical detector;

said optical detector for detecting the formed image of the element; and an arithmetic operation circuit for obtaining the position of each element from a detection signal of said optical detector;

said lens array, said image forming lens and said detecting means being arranged so that the image of the light from each lens of said lens array is formed within the light receiving region of said optical detector;

wherein a wavelength filter is disposed at a position selected from the group consisting of between said plural elements and the lens array, between the lens array and the image forming lens and between both, and a filter whose transmission wavelength is variable is further disposed before said optical detector.

21. The array element examination device according to claim 20 wherein a variable wavelength light source is used as a light source for performing transmission or reflection for the array element.

* * * * *